United States Patent
Fan et al.

(10) Patent No.: US 10,358,525 B2
(45) Date of Patent: *Jul. 23, 2019

(54) INDUSTRIAL POLYESTER AND ITS PREPARATION METHOD

(71) Applicant: JIANGSU HENGLI CHEMICAL FIBRE CO., LTD., Suzhou (CN)

(72) Inventors: Hongwei Fan, Suzhou (CN); Fangming Tang, Suzhou (CN); Xiaoyu Wang, Suzhou (CN); Wengang Li, Suzhou (CN); Lili Wang, Suzhou (CN); Shanshui Wang, Suzhou (CN); Qianhan Liu, Suzhou (CN); Zangzang Niu, Suzhou (CN)

(73) Assignee: JIANGSU HENGLI CHEMICAL FIBRE CO., LTD., Suzhou (CN)

( * ) Notice: Subject to any disclaimer, the term of this patent is extended or adjusted under 35 U.S.C. 154(b) by 31 days.

This patent is subject to a terminal disclaimer.

(21) Appl. No.: 15/744,867

(22) PCT Filed: Jun. 12, 2016

(86) PCT No.: PCT/CN2016/085409
§ 371 (c)(1),
(2) Date: Jan. 15, 2018

(87) PCT Pub. No.: WO2017/113621
PCT Pub. Date: Jul. 6, 2017

(65) Prior Publication Data
US 2018/0201726 A1     Jul. 19, 2018

(30) Foreign Application Priority Data
Dec. 29, 2015 (CN) .......................... 2015 1 1017994

(51) Int. Cl.
*C08G 63/02* (2006.01)
*C08G 63/183* (2006.01)
*C08G 63/83* (2006.01)
*C08G 63/90* (2006.01)
*C08G 63/86* (2006.01)
*C25B 3/12* (2006.01)
*D01F 6/62* (2006.01)
*C08G 63/78* (2006.01)

(52) U.S. Cl.
CPC .......... *C08G 63/183* (2013.01); *C08G 63/78* (2013.01); *C08G 63/83* (2013.01); *C08G 63/866* (2013.01); *C08G 63/90* (2013.01); *C25B 3/12* (2013.01); *D01F 6/62* (2013.01)

(58) Field of Classification Search
USPC ................................ 528/271, 272, 273, 285
See application file for complete search history.

(56) References Cited

U.S. PATENT DOCUMENTS

2018/0201725 A1* 7/2018 Fan ...................... C08G 63/183

FOREIGN PATENT DOCUMENTS

| CN | 1844188 A | 10/2006 |
| CN | 1986596 A | 6/2007 |
| CN | 101020744 A | 8/2007 |
| CN | 102164985 A | 8/2011 |
| CN | 103476863 A | 12/2013 |
| CN | 105461911 A | 4/2016 |

* cited by examiner

*Primary Examiner* — Terressa Boykin
(74) *Attorney, Agent, or Firm* — Gokalp Bayramoglu

(57) ABSTRACT

A polyester obtained by the esterification of terephthalic acid and ethylene glycol and the polycondensation catalysed by a mixture of magnesium ethylene glycol and antimony ethylene glycol followed by granulation. In the polyester sections, the carboxyl end group is less than 15 mol/t, the mass percentage of oligomer is lower than 0.5%, and weight percentage of diethylene glycol is lower than 0.5%.

10 Claims, No Drawings

INDUSTRIAL POLYESTER AND ITS PREPARATION METHOD

CROSS-REFERENCE TO RELATED APPLICATIONS

This application is the national stage entry of International Application No. PCT/CN2016/085409, filed on Jun. 12, 2016 which claims the benefit of priority from Chinese Patent Application No. CN201511017994.9, filed on Dec. 29, 2015, the entire contents of which are incorporated herein by reference.

TECHNICAL FIELD

The present invention discloses an industrial polyester and its preparation method. Specifically, the polyester according to the present invention is obtained by the esterification of terephthalic acid and ethylene glycol and the polycondensation catalysed by a mixture of magnesium ethylene glycol and antimony ethylene glycol followed by granulation. Additionally, the present invention discloses the polyester sections that are scoured and washed with water and a rinsing agent at 120-130° C. and 0.2-0.3 MPa. and its preparation method.

BACKGROUND

Polyethylene terephthalate (PET) is a kind of polymer with excellent performance. PET is preferred because of its high modulus, high strength, crispness, good shape retention, safe and clean, and good barrier property. It is widely used in fiber industry, bottle packaging, film production and sheets materials, etc. The output production of PET is increasing year by year and its status in the industry ha s been significantly improved.

Industrial polyester fiber mainly refers to those used in industry, national defense, medical care, environmental protection and cutting-edge science. It is a kind of chemical fiber which has relatively special physical and chemical structure, properties and uses, or with special functions. The characteristics can be found in its resistance against strong corrosion, wearing, high temperature, radiation, fire, burning, high voltage current. It also has high strength and high modulus, and a variety of medical usage. The tent cloth using the high strength and low shrinkage polyester industrial filament has high peel strength and tear strength, which make the tent cloth suitable for various purposes, including flexible advertising light box materials, inflatable structural materials, tent-like buildings' fabric sunshade tent and so on. The high strength and low shrinkage industrial yarn-based fabric materials are also applied in special protective clothing, camouflage, covering, backpack and other military supplements. As a kind of geotextile material with the advantages of light, soft, high strength, wear-resistant, corrosion-resistant, non-conductive, shock absorption and so on, it is also reliable and convenient to use. It can make our work more efficient, and will not damage the lifting objects. The expansion of industrial polyester fiber's applications has led the whole fiber industry to a more competitive edge in application areas. Polyester high-performance fibers are playing increasingly important role in many aspects including reducing the weight of composite materials, durability in use and reducing maintenance costs and so on. In the next few decades, the development of high-performance polyester fiber is not only the progress of its amount, but also the development in the field of application and enhancement of the overall competitiveness of the industry chain to achieve substantial results.

High strength, high modulus, low shrinkage, dimensional stability, functionalization will be the main direction of the development of industrial polyester fiber. The tuber quality is related to the collection of polyester polymer structure, mainly related to the intermolecular force, crystal morphology and structure, orientation state structure, etc., and the shape and structure of the crystal is one of the key points. Industrial polyester yarn is widely used in different fields. The industrial polyester according to the present invention has the characteristics of lower dry heat shrinkage and better dimensional stability.

Carboxyl end group, oligomer, and diethylene glycol (DEG) content are important quality indicators of polyester sections, in which oligomer and diethylene glycol are low molecular polymer. These reflect not only the quality of production status, but also affect the product quality after the spinning process. Therefore, reducing the carboxyl end groups, oligomers, diethylene glycol content in polyester sections plays an important role in improving the quality of polyester products. The influence of carboxyl end groups on the performance of polymers cannot be ignored. Only by controlling the amount of polyester end carboxyl groups in the production, can we stabilize the uniformity of molecular weight distribution. The amount of diethylene glycol in the polyester sections is a very important quality index in polyester production. Because it has a direct impact on the melting point of polyester sections, the melting point of polyester sections will decline sharply with the increase of DEG content, so it not only reflects the quality of production, but also directly affects the post-processing and spinning process and silk quality. Oligomer in polyester is low molecular polymer with a degree of polymerization of less than 10 and can be classified into linear oligomers and cyclic oligomers, of which the majority are cyclic polymers, especially cyclic trimers. The oligomer is mainly influencing heterogeneous nucleation, spinning processing, the performance of polyester and after processing caused some adverse effects. Controlling the content of the three in polyester sections a very important issue in the polyester production process.

SUMMARY

The present invention discloses an industrial polyester and its preparation method, which is the polyester and the preparation method using the polycondensation catalyst that is the mixture of magnesium ethylene glycol and the antimony ethylene glycol. The present invention applies the mixture of magnesium ethylene glycol and the antimony ethylene glycol as the polycondensation catalyst in order to decrease the thermal degradation coefficient to minimum. Additionally, the polyester sections are scoured and washed with water and a rinsing agent at 120-130° C. and 0.2-0.3 MPa to reduce the influences of carboxyl end groups, oligomers, diethylene glycol content in polyester spinning process.

An industrial polyester according to the present invention, characterized in that the polyester according to the present invention is obtained by the esterification of terephthalic acid and ethylene glycol and the polycondensation catalysed by a mixture of magnesium ethylene glycol and antimony ethylene glycol followed by granulation.

A process for preparing the industrial polyester, wherein the carboxyl end group is less than 15 mol/t, the mass percentage of oligomer is lower than 0.5%, and weight percentage of diethylene glycol is lower than 0.5%.

A process for preparing the industrial polyester, wherein the molecular formula of magnesium ethylene glycol is $Mg(OCH_2CH_2OH)_2$.

A process for preparing the industrial polyester, wherein the dissolution and washing refers to that the granulated sections are scoured and washed with water and a rinsing agent at 120-130° C. and 0.2-0.3 MPa.

High strength, high modulus, low shrinkage, dimensional stability, functionalization will be the main direction of the development of industrial polyester fiber, and what affects the fiber quality is the aggregate structure of polyester polymer, which is mainly related to the intermolecular force, crystal morphology and structure, orientation state structure, etc. Among them, the shape and structure of the crystal is one of the key points.

Low shrinkage and dimensional stability are the main factors that make high quality polyester. The macroscopic heat shrinkage of polyester fibers is due to the entropy change tendency of the macromolecular chains of local elongation, including the internal stress caused by the development of the crimp state and the axial internal stress frozen in the spinning process in the sample, this local internal stress can be transmitted from the molecular network structure to the entire material, which will occur when the outside world to provide enough heat.

Polyester fibers are oriented semi-crystalline polymer materials, which are composed of structural units with different orientation stability: (1) high-stability and high-perfection crystalline parts; (2) relatively low-stability imperfect crystalline parts; (3) low-stability transition layer between crystalline and amorphous; (4) Unstable oriented amorphous phase. When the polyester fiber is heated, things may happen as followed, the oriented amorphous phase is retarded and crystallized; failure of the imperfect crystalline portion and recrystallization may occur: thickening of the crystal grains or complete melting of the crystal grains. It shows that the grain size and the degree of crystal refinement are the important factors to affect the dimensional stability of the fiber at high temperature. The low thermal shrinkage at 177° C. is an excellent thermal dimensional stability fiber with two structural features: large grain size and good crystallinity. Therefore, the fiber grain size and crystallization of good integrity, is the guarantee of low shrinkage fiber's quality.

The main factors affecting the crystallization of polyester are: 1. the structure of the molecular chain itself. 2. the choice of crystallization temperature. 3. the impact of molecular weight. 4. the application of nucleating agent. 5. Finally, the impact of preparation method. Nucleation is a very important part of crystallization, and the nucleating agent to some extent can speed up the crystallization process, while the more important thing to industrial polyester yarn is the impact of the size and perfection of the crystallization.

If the content of carboxyl end group is high in polyester, the thermal stability of polyester resin is poor, while the carboxylate salt of big polyester molecular chain is formed by the reaction of the carboxylate and polyester, which constitutes a nucleus that can accelerate heterogeneous nucleation of the polyester. Polyester contains 3-4% of oligomers, mostly in the form of low molecular ether and ester, mainly cyclic oligomer, and diethylene glycol. The influence of oligomers on the quality of the polyester cannot be ignored. They can affect the crystallization nucleation mechanism, crystallinity, crystal morphology and crystallization integrity of the polyester mainly in the form of nucleating agent, thereby affecting the quality of the polyester fiber, especially the thermal shrinkage of the industrial polyester yarn. Pure polyester without diethylene glycol will not exhibit abnormal spherulitic morphology regardless of the crystallization conditions; however, when the sample contains diethylene glycol, normal and abnormal spherulites will coexist in the crystalline zone, and as the content of diethylene glycol increases, the proportion of abnormal spherulites increases in the entire morphology thereby affecting the integrity of the crystals and reducing the crystallinity of the polyester. Cyclic trimer in the polyester to nucleate more ways, more nucleating agent, crystallization speed, the number of large grains, but the smaller grain size, and thus affect the integrity of the crystallization. Heterogeneous nucleation increased, making high degree of stability and high degree of completion of the part of the crystal to reduce, and the enlargement of transition layer between imperfect crystalline portion with relatively low stability and low-stability crystalline and amorphous increases the polyester fiber shrinkage has an adverse effect on the thermal shrinkage of the polyester fiber.

An industrial polyester according to the present invention characterized in that the number average molecular weight of the said industrial polyester is 15000 to 22000.

The polyester according to the present invention, wherein the mass ratio of magnesium ethylene glycol to antimony ethylene glycol in their mixture is 2 to 3:1.

The present invention also discloses a preparation method of the industrial polyester that the polyester is obtained by the esterification of terephthalic acid and ethylene glycol and the polycondensation catalyzed by a mixture of magnesium ethylene glycol and antimony ethylene glycol, polyester section is obtained by granulating. Then the polyester section is prepared after dissolution and washing.

A process for preparing the industrial polyester according to the present invention, wherein the process is:

a. The Preparation of Catalyst (Magnesium Ethylene Glycol)

Add ethylene glycol in the single-compartment electrolytic cell, magnesium chloride is the supporting electrolyte, the anode is comprised of magnesium, the cathode is graphite. At 50 to 60° C. the apparatus is operated about 10 to 12 h under DC, for the initial voltage 6 to 10V, cathodic current density 150 to 200 mA. After the electrolysis, the white suspension liquid is obtained followed by removing the electrodes, decompression filtration and washing by anhydrous alcohol, then we obtain the magnesium ethylene glycol after drying.

b. The preparation of Polyester, Including the Esterification and Polycondensation The esterification reaction uses terephthalic acid and ethylene glycol as raw materials, adding polyether-inhibitor in to obtain esterification products after reaction. The esterification reaction needs the increase of pressure in the nitrogen atmosphere, and the pressure is controlled in the scale of atmospheric pressure to 0.3 MPa, the temperature is controlled between 250 to 260° C. The end of the reaction is set after the amount of distillate water in the esterification reaction reaches 90% of the theoretical value at least. The condensation reaction, includes the low vacuum stage and the high vacuum stage of the condensation reaction:

In the low vacuum stage of such condensation reaction, the catalyst and stabilizer need to be added into the esterification production. The condensation reaction will start under the condition of negative pressure. In such period, the pressure needs to be pumped smoothly from atmospheric pressure to the pressure lower than the absolute pressure 500 Pa, and the temperature needs to be controlled between 260 to 270° C. The reaction time should be 30 to 50 mins. The catalyst the reaction used is the mixture of magnesium ethylene glycol and antimony ethylene glycol.

The high vacuum stage of the condensation reaction, requires continuously pumping vacuum after the low vacuum period in order to ensure that the reaction pressure is decreased to absolute pressure lower than 100 Pa. The reaction temperature needs to be controlled between 275 to 280° C., and the reaction time needs to be 50-90 mins.

Then the polyester is prepared and the polyester section can be made through granulation.

The polyester section is scoured and washed with water and rinsing agent at 120 to 130° C. and 0.2 to 0.3 MPa for 3 to 5 h followed by washing with water.

A process for preparing the polyester according to the present invention, characterized in that the molar ratio of the ethylene glycol to terephthalic acid is 1.2:1 to 2.0:1.

A process for preparing the polyester according to the present invention, characterized in that the mass ratio of magnesium ethylene glycol to antimony ethylene glycol in their mixture is 2 to 3:1. The mass of the catalyst is 0.01-0.05% of the terephthalic acid.

The use of magnesium glycol and antimony ethylene glycol mixture as a polycondensation catalyst is because that magnesium glycol is relatively mild, the thermal degradation coefficient is small, less side reactions caused during the reaction, which can reduce terminal carboxyl and oligomer in production. The main factors causing thermal degradation are high temperature and the catalyst. High temperature is because the reaction strength is too high, leading to accelerated degradation, which results in carboxyl end groups, but also increases the cyclic oligomer. Catalyst is related to the catalyst degradation reaction constant. In polycondensation process, the role of the catalyst is not only to catalyse the formation of the main reaction, and to affect the rate and yield of the reaction, but also to catalytic thermal degradation and ether bond formation, increase the content of diethylene glycol, thereby increasing the content of carboxyl end groups.

A process for preparing an industrial polyester, wherein the stabilizer is chosen from triphenyl phosphate, trimethyl phosphate and trimethyl phosphite. The mass of stabilizer is 0.01 to 0.05% of the terephthalic acid. Stabilizers are mainly phosphate ester, whose function is to capture the reaction generated during the polymerization of free radicals, and reduce side effects.

A process for preparing industrial polyester, wherein the mass ratio of the water and the rinse agent is 100:4 to 100:3, the ratio of polyester sections and water and the rinse agent, that is, the solid-liquid ratio is 1:10 to 1:5. The rinsing agent is chosen from ethylene glycol monoethyl ether, ethylene glycol monopropyl ether and ethylene glycol monobutyl ether. Add a small amount of rinsing agent to the water, and rinsing agent dissolves in water, and it can also dissolve most of the low molecular ether and ester, which helps to improve the washing effect and oligomer reduction.

A process for preparing an industrial polyester, wherein the washed polyester sections are washed with hot water at 70-80° C. for 10-15 mins after brewing, washed with cold water, dried and cooled and reserved.

A process for preparing an industrial polyester, the polyether inhibitor is chosen from sodium acetate and calcium acetate, the mass of polyether-inhibitor agent is 0.01-0.05% of terephthalic acid. The polyether-inhibitor agent reduces the formation of ether under acidic conditions by adding a small amount of NaAc, thereby reducing the reaction of ethylene glycol to diethylene glycol.

The present invention is intended to provide an industrial polyester which employs a relatively mild type of polycondensation catalyst, magnesium ethylene glycol. With less side reaction induced during the reaction and less thermal degradation during processing, it reduced the production of oligomers in the process. Polyester sections were brewed at 130° C. and 0.3 MPa with water and solvent, which improved the washing effect and oligomer reduction. The reduction of oligomer in polymerization process, and the reduction of the thermal degradation during processing, greatly reduce the impurities in the polyester, and also reduce the amount of nucleating agent in the polyester, and increase homogeneous nucleation rate on the basis of the reduction f heterogeneous nucleation. It is conducive to industrial polyester in the grain size growth and crystallization optimization.

Benefits:

This method uses the mix ire of magnesium glycol and antimony ethylene glycol as a polycondensation catalyst. Magnesium glycol is relatively mild, the thermal degradation coefficient is small, and fewer side effects in the reaction process reduce production of terminal carboxyl and oligomer in process.

The content of carboxyl groups in the polyester sections is less than 15 mol/t, the content of oligomers is less than 0.5% and the content of diethylene glycol is less than 0.5%, which is beneficial to further improve the fiber quality.

a Polyester sections can be washed with water and the detergent at 120~130° C. and 0.2~0.3 MPa to improve the washing effect and reduce the oligomer.

Polyether-inhibitor agent reduces the formation of ether under acidic conditions by adding a small amount of NaAc, which reduces the activity of ethylene glycol to diethylene glycol.

Oligomer's decreasing during polymerization, and the reduction of thermal degradation during the process, greatly reduce the impurities in the polyester, and also reduce the amount of nucleating agent in polyester, and increase homogeneous nucleation rate on the basis of reducing the heterogeneous nucleation in the process, which is conducive to industrial polyester pain size growth and crystallization of the optimization.

DETAILED DESCRIPTION

Hereinafter, the present invention will be described in more detail by the following examples, but not limited thereto. It should be noticed that these examples are only for illustrating the present invention and are not intended to limit the scope of the present invention. In addition, it should be noticed that after reading the content of the present invention, those skilled in this field can make various modifications or changes to the present invention, and these equivalent forms also apply to the scope of the appended claims of this application.

An industrial polyester according to the present invention, characterized in that the polyester according to the present invention is obtained by the esterification of terephthalic acid and ethylene glycol and the polycondensation catalysed by a mixture of magnesium ethylene glycol and antimony ethylene glycol followed by granulation.

A process for preparing the industrial polyester, wherein the carboxyl end group is less than 15 mol/t, the mass percentage of oligomer is lower than 0.5% and weight percentage of diethylene glycol is lower than 0.5%.

A process for preparing the industrial polyester, wherein the molecular formula of magnesium ethylene glycol is $Mg(OCH_2CH_2OH)_2$.

A process for preparing the industrial polyester, wherein the dissolution and washing refers to that the granulated sections are scoured and washed with water and a rinsing agent at 120-130° C. and 0.2-0.3 MPa.

An industrial polyester according to the present invention characterized in that the number average molecular weight of the said industrial polyester is 15000 to 22000.

The polyester according to the present invention, wherein the mass ratio of magnesium ethylene glycol to antimony ethylene glycol in their mixture is 2 to 3:1.

EXAMPLE 1

A process for preparing a high-modulus low-shrinkage polyester industrial yarn, wherein the main process is:
1. Preparation of Catalyst Magnesium Glycol:

Add ethylene glycol into the single-compartment electrolytic cell, magnesium chloride is electrolyte, the anode is magnesium, the cathode is graphite. Under DC, the initial voltage is 6V, the cathode current density is 150 mA, and electrolysis is carried out for 10 hours at 50° C. Remove the electrode after the electrolysis, we can get white suspension. Filter it under reduced pressure, wash the white solid with anhydrous ethanol, and we get magnesium ethylene glycol.

2. Preparation of Polyester, Including Esterification and Polycondensation:

Esterification Reaction:

Using terephthalic acid and ethylene glycol as raw materials, ethylene glycol and terephthalic acid molar ratio of 1.2:1. Start esterification reaction under nitrogen atmosphere pressure, and control the pressure at atmospheric pressure, the temperature at 250° C. When esterified water distillate amount reaches 92% of the theoretical value of the esterification, reaction ends.

Polycondensation Reaction:

Including Polycondensation Reaction of Low Vacuum Phase and Polycondensation Reaction High Vacuum Phase:

In the polycondensation reaction low vacuum stage, add catalyst and the stabilizer acid triphenyl ester into the esterification product. The acid triphenyl ester dosage is 0.01% of terephthalic acid by weight, and the amount of catalyst is 0.01% of terephthalic acid by mass. The polycondensation reaction is started under the condition of negative pressure, the pressure is steadily pumped from the atmospheric pressure to the absolute pressure of 490 Pa, the temperature is controlled at 260° C., and the reaction time is 30 minutes. The catalyst is a mixture of magnesium ethylene glycol and antimony ethylene glycol, in which magnesium glycol and antimony ethylene glycol mass ratio is 2:1;

After the polycondensation reaction in the low-vacuum stage, the vacuum is continued to reduce the reaction pressure to 99 Pa, the reaction temperature is controlled at 275° C., and the reaction time is 50 minutes. The polyester sections are obtained by granulation.

Polyester sections are washed with water and rinsing agent ethylene glycol monoethyl ether at 120° C. and 0.2 MPa for 3 hours. After washing, the polyester sections are washed with hot water at 70° C. for 10 minutes and then washed with cold water. After drying and cooling, the polyester with the number average molecular weight of 15000 is obtained. The mass ratio of water to the rinsing agent is 100:3, the ratio of the polyester section to the water and the rinsing agent, that is, the solid to liquid ratio is 1:5.

EXAMPLE 2

A process for preparing a high-modulus low-shrinkage polyester industrial yarn, wherein the main process is:
1. Preparation of Catalyst Magnesium Glycol:

Add ethylene glycol into the single-compartment electrolytic cell, magnesium chloride is electrolyte, the anode is magnesium, the cathode is graphite. Under DC, the initial voltage is 10V the cathode current density is 200 mA, and electrolysis is carried out for 12 hours at 60° C. Remove the electrode after the electrolysis, we can get white suspension. Filter it under reduced pressure, wash the white solid with anhydrous ethanol, and we get magnesium ethylene glycol.

2. Preparation of Polyester, Including Esterification and Polycondensation:

Esterification Reaction:

Using terephthalic acid and ethylene glycol as raw materials, ethylene glycol and terephthalic acid molar ratio of 2.0:1. Start esterification reaction under nitrogen atmosphere pressure, and control the pressure at 0.3 MPa, the temperature at 260° C. When esterified water distillate amount reaches 93% of the theoretical value of the esterification, reaction ends.

Polycondensation Reaction:

Including Polycondensation Reaction of Low Vacuum Phase and Polycondensation Reaction High Vacuum Phase:

In the polycondensation reaction low-vacuum stage, add catalyst and the stabilizer acid triphenyl ester into the esterification product. The acid triphenyl ester dosage is 0.05% of terephthalic acid by weight, and the amount of catalyst is 0.05% of terephthalic acid by mass. The polycondensation reaction is started under the condition of negative pressure, the pressure is steadily pumped from the atmospheric pressure to the absolute pressure of 495 Pa, the temperature is controlled at 270° C., and the reaction time is 50 minutes. The catalyst is a mixture of magnesium ethylene glycol and antimony ethylene glycol, in which magnesium glycol and antimony ethylene glycol mass ratio is 3:1;

After the polycondensation reaction in the low-vacuum stage, the vacuum is continued to reduce the reaction pressure to 95 Pa, the reaction temperature is controlled at 276° C., and the reaction time is 55 minutes. The polyester sections are obtained by granulation.

Polyester sections are washed with water and rinsing agent ethylene glycol monoethyl ether at 130° C. and 0.3 MPa for 5 hours. After washing, the polyester sections are washed with hot water at 80° C. for 15 minutes and then washed with cold water. After drying and cooling, the polyester with the number average molecular weight of 22000 is obtained. The mass ratio of water to the rinsing agent is 100:34, the ratio of the polyester section to the water and the rinsing agent, that is, the solid to liquid ratio is 1:10.

EXAMPLE 3

A process for preparing a high-modulus low-shrinkage polyester industrial yarn, wherein the main process is:
1. Preparation of Catalyst Magnesium Glycol:

Add ethylene glycol into the single-compartment electrolytic cell, magnesium chloride is electrolyte, the anode is magnesium, the cathode is graphite. Under DC, the initial voltage is 7V, the cathode current density is 160 mA, and electrolysis is carried out for 11 hours at 55° C. Remove the electrode after the electrolysis, we can get white suspension.

Filter it under reduced pressure, wash the white solid with anhydrous ethanol, and we get magnesium ethylene glycol.

2. Preparation of Polyester, Including Esterification and Polycondensation:

Esterification Reaction:

Using terephthalic acid and ethylene glycol as raw materials, ethylene glycol and terephthalic acid molar ratio of 1.2:1. Start esterification reaction under nitrogen atmosphere pressure, and control the pressure at 0.2 MPa, the temperature at 255° C. When esterified water distillate amount reaches 95% of the theoretical value of the esterification, reaction ends.

Polycondensation Reaction:

Including Polycondensation Reaction of Low Vacuum Phase and Polycondensation Reaction High Vacuum Phase:

In the polycondensation reaction low-vacuum stage, add catalyst and the stabilizer acid triphenyl ester into the esterification product The acid triphenyl ester dosage is 0.05% of terephthalic acid by weight, and the amount of catalyst is 0.02% of terephthalic acid by mass. The polycondensation reaction is started under the condition of negative pressure, the pressure is steadily pumped from the atmospheric pressure to the absolute pressure of 495 Pa, the temperature is controlled at 266° C., and the reaction time is 35 minutes. The catalyst is a mixture of magnesium ethylene glycol and antimony ethylene glycol, in which magnesium glycol and antimony ethylene glycol mass ratio is 2:1;

After the polycondensation reaction in the low-vacuum stage, the vacuum is continued to reduce the reaction pressure to 90 Pa, the reaction temperature is controlled at 278° C., and the reaction time is 60 minutes. The polyester sections are obtained by granulation.

Polyester sections are washed with water and rinsing agent ethylene glycol monoethyl ether at 126° C. and 0.25 MPa for 5 hours. After washing, the polyester sections are washed with hot water at 75° C. for 12 minutes and then washed with cold water. After drying and cooling, the polyester with the number average molecular weight of 16000 is obtained. The mass ratio of water to the rinsing agent is 100:3, the ratio of the polyester section to the water and the rinsing agent, that is, the solid to liquid ratio is 1:8.

EXAMPLE 4

A process for preparing a high-modulus low-shrinkage polyester industrial yarn, wherein the main process is:

1. Preparation of Catalyst Magnesium Glycol:

Add ethylene glycol into the single-compartment electrolytic cell, magnesium chloride is electrolyte, the anode is magnesium, the cathode is graphite. Under DC, the initial voltage is 7V the cathode current density is 180 mA, and electrolysis is carried out for 12 hours at 50° C. Remove the electrode after the electrolysis, we can get white suspension. Filter it under reduced pressure, wash the white solid with anhydrous ethanol, and we get magnesium ethylene glycol.

2. Preparation of Polyester, Including Esterification and Polycondensation:

Esterification Reaction:

Using terephthalic acid and ethylene glycol as raw materials, ethylene glycol and terephthalic acid molar ratio of 1.5:1. Start esterification reaction under nitrogen atmosphere pressure, and control the pressure at 0.3 MPa, the temperature at 255° C. When esterified water distillate amount reaches 96% of the theoretical value of the esterification, reaction ends.

Polycondensation Reaction:

Including Polycondensation Reaction of Low Vacuum Phase and Polycondensation Reaction High Vacuum Phase:

In the polycondensation reaction low-vacuum stage, add catalyst and the stabilizer acid triphenyl ester into the esterification product. The acid triphenyl ester dosage is 0.03% of terephthalic acid by weight, and the amount of catalyst is 0.01% of terephthalic acid by mass. The polycondensation reaction is started under the condition of negative pressure, the pressure is steadily pumped from the atmospheric pressure to the absolute pressure of 480 Pa, the temperature is controlled at 266° C, and the reaction time is 40 minutes. The catalyst is a mixture of magnesium ethylene glycol and antimony ethylene glycol, in which magnesium glycol and antimony ethylene glycol mass ratio is 2:1;

After the polycondensation reaction in the low-vacuum stage, the vacuum is continued to reduce the reaction pressure to 96 Pa, the reaction temperature is controlled at 275° C. and the reaction time is 90 minutes. The polyester sections are obtained by granulation.

Polyester sections are washed with water and rinsing agent ethylene glycol monoethyl ether at 125° C. and 0.2 MPa for 3 hours. After washing, the polyester sections are washed with hot water at 70° C. for 10 minutes and then washed with cold water. After drying and cooling, the polyester with the number average molecular weight of 17000 is obtained. The mass ratio of water to the rinsing agent is 100:4, the ratio of the polyester section to the water and the rinsing agent, that is, the solid to liquid ratio is 1:8.

EXAMPLE 5

A process for preparing a high-modulus low-shrinkage polyester industrial yarn, wherein the main process is:

1. Preparation of Catalyst Magnesium Glycol:

Add ethylene glycol into the single-compartment electrolytic cell, magnesium chloride is electrolyte, the anode is magnesium, the cathode is graphite. Under DC, the initial voltage is 9V, the cathode current density is 160 mA, and electrolysis is carried out for 10 hours at 55° C. Remove the electrode after the electrolysis, we can get white suspension. Filter it under reduced pressure, wash the white solid with anhydrous ethanol, and we get magnesium ethylene glycol.

2. Preparation of Polyester, Including Esterification and Polycondensation:

Esterification Reaction:

Using terephthalic acid and ethylene glycol as raw materials, ethylene glycol and terephthalic acid molar ratio of 1.6:1. Start esterification reaction under nitrogen atmosphere pressure, and control the pressure at 0.2 MPa, the temperature at 265° C. When esterified water distillate amount reaches 91% of the theoretical value of the esterification, reaction ends.

Polycondensation Reaction:

Including Polycondensation Reaction of Low Vacuum Phase and Polycondensation Reaction High Vacuum Phase:

In the polycondensation reaction low-vacuum stage, add catalyst and the stabilizer acid triphenyl ester into the esterification product. The acid triphenyl ester dosage is 0.02% of terephthalic acid by weight, and the amount of catalyst is 0.02% of terephthalic acid by mass. The polycondensation reaction is started under the condition of negative pressure, the pressure is steadily pumped from the atmospheric pressure to the absolute pressure of 496 Pa, the temperature is controlled at 265° C., and the reaction time is 35 minutes. The catalyst is a mixture of magnesium ethylene glycol and antimony ethylene glycol, in which magnesium glycol and antimony ethylene glycol mass ratio is 2:1;

After the polycondensation reaction in the low-vacuum stage, the vacuum is continued to reduce the reaction pressure to 90 Pa, the reaction temperature is controlled at 280° C., and the reaction time is 70 minutes. The polyester sections are obtained by granulation.

Polyester sections are washed with water and rinsing agent ethylene glycol monoethyl ether at 125° C. and 0.25 MPa for 4 hours. After washing, the polyester sections are washed with hot water at 75° C. for 12 minutes and then washed with cold water. After drying and cooling, the polyester with the number average molecular weight of 21000 is obtained. The mass ratio of water to the rinsing agent is 100:3, the ratio of the polyester section to the water and the rinsing agent, that is, the solid to liquid ratio is 1:6.

What is claimed is:

1. An industrial polyester produced by an esterification of terephthalic acid and ethylene glycol and polycondensation catalysed by a mixture of magnesium ethylene glycol and antimony ethylene glycol followed by granulation;
    wherein a carboxyl end group is less than 15 mol/t, a mass percentage of oligomer is lower than 0.5%, and a weight percentage of diethylene glycol is lower than 0.5%;
    wherein the molecular formula of magnesium ethylene glycol is $Mg(OCH_2CH_2OH)_2$.

2. The industrial polyester according to claim 1, wherein an average molecular weight of the said industrial polyester is 15000 to 22000.

3. The polyester according to claim 1, wherein a mass ratio of magnesium ethylene glycol to antimony ethylene glycol in their mixture is 2 to 3:1.

4. A process for preparing a polyester, the process comprising: obtaining the polyester by esterification of terephthalic acid and ethylene glycol; and polycondensation catalyzed by a mixture of magnesium ethylene glycol and antimony ethylene glycol; granulating to obtain a polyester section; performing dissolution and washing to obtain the polyester.

5. The process for preparing the polyester according to claim 4, wherein the preparation method of the polyester includes:
    preparing magnesium ethylene glycol,
    adding ethylene glycol in a single-compartment electrolytic cell, wherein magnesium chloride is a supporting electrolyte, an anode is comprised of magnesium, a cathode is graphite; operating the single-compartment electrolytic cell at 50 to 60° C. for 10 to 12h under DC, at an initial voltage of 6 to 10V, a cathodic current density of 150 to 200mA; after the electrolysis, a white suspension liquid is obtained followed by removing the electrodes, decompression filtration and washing by anhydrous alcohol, to obtain the magnesium ethylene glycol after drying;
    performing the esterification and polycondensation to prepare polyester,
    using terephthalic acid and ethylene glycol as raw materials for the esterification reaction, adding a polyether-inhibitor to obtain esterification products after the esterification reaction; wherein the esterification reaction is performed at a pressure controlled in the scale of atmospheric pressure to 0.3MPa, and a temperature controlled between 250 to 260° C.; the esterification reaction is completed after an amount of distillate water in the esterification reaction reaches at least at 90% of a theoretical value;
    performing a condensation reaction, including a low vacuum stage and a high vacuum stage of the condensation reaction,
    wherein, in the low vacuum stage of the condensation reaction, adding a catalyst and a stabilizer into a product obtained from the esterification reaction; wherein the condensation reaction is performed under a negative pressure, where the pressure is decreased gradually from the atmospheric pressure to a pressure lower than the absolute pressure 500Pa, and a temperature of the condensation reaction is controlled between 260 to 270° C.; wherein the reaction is carried out for 30 to 50mins; wherein the catalyst is the mixture of magnesium ethylene glycol and antimony ethylene glycol;
    in the high vacuum stage of the condensation reaction, continuously pumping vacuum after the low vacuum stage of the condensation reaction to an absolute pressure lower than 100Pa, the low vacuum stage of the condensation reaction temperature is controlled between 275 to 280° C., and the low vacuum stage of the condensation reaction is carried out for 50 to 90 mins;
    then preparing the polyester section through granulation;
    scouring and washing the polyester section with water and a rinsing agent at 120 to 130° C. and 0.2 to 0.3 MPa for 3 to 5 h followed by washing with water.

6. The process for preparing the polyester according to claim 5, wherein a molar ratio of the ethylene glycol to terephthalic acid is 1.2:1 to 2.0:1.

7. The process for preparing the polyester according to claim 5, wherein a mass ratio of magnesium ethylene glycol to antimony ethylene glycol in mixture is 2 to 3:1; a mass of the catalyst is 0.01-0.05% of the terephthalic acid; the stabilizer is selected from the group consisting of triphenyl phosphate, trimethyl phosphate and trimethyl phosphite, wherein the mass of stabilizer is 0.01-0.05% of the terephthalic acid.

8. The process for preparing the polyester according to claim 5, wherein a mass ratio of water to the rinsing agent is 100:4 to 100:3, and a ratio of polyester section to water and the rinsing agent is 1:5~10, the rinsing agent is selected from the group consisting of 2-ethoxyethanol, 2-propoxyethanol and ethylene glycol monobutyl ether.

9. The process for preparing the polyester according to claim 5, wherein the cleaning is performed by washing the polyester sections with 70-80° C. water for 10-15min after scouring the polyester sections, then washing with cold water, and drying and cooling down to make the polyester sections.

10. The process for preparing the polyester according to claim 5, wherein the polyether inhibitor is selected from the group consisting of sodium acetate and calcium acetate, the mass of polyether-inhibitor is 0.01-0.05% of terephthalic acid.

* * * * *